US005956709A

United States Patent [19]
Xue

[11] Patent Number: 5,956,709
[45] Date of Patent: Sep. 21, 1999

[54] DYNAMIC DATA ASSEMBLING ON INTERNET CLIENT SIDE

[76] Inventor: Yansheng Xue, 111 Union Bldg., BTR, La. 70803

[21] Appl. No.: 08/900,941

[22] Filed: Jul. 28, 1997

[51] Int. Cl.⁶ .................................................. G06F 17/30
[52] U.S. Cl. ...................... 707/3; 707/3; 707/4; 705/26; 705/27
[58] Field of Search .................................... 707/3, 4, 103

[56] References Cited

U.S. PATENT DOCUMENTS

| | | | |
|---|---|---|---|
| 5,715,453 | 2/1998 | Stewart | 395/615 |
| 5,721,908 | 2/1998 | Lagarde et al. | 395/610 |
| 5,737,619 | 4/1998 | Judson | 395/761 |
| 5,745,681 | 4/1998 | Levine et al. | 395/200.3 |
| 5,751,956 | 5/1998 | Kirsch | 395/200.33 |
| 5,793,964 | 8/1998 | Rogers et al. | 395/200.32 |
| 5,793,966 | 8/1998 | Amstein et al. | 395/200.33 |

OTHER PUBLICATIONS

"A Study of Picking," D. Craft, *Journal of Object-Oriented Programming*, Jan. 1993, pp. 54–66.
"A Study of Pickling–Emphasizing C++," D. Craft, Paper No. STL–89–2 (Olivetti Software Technology Laboratory, Sept, 1989).

*Primary Examiner*—Paul R. Lintz
*Assistant Examiner*—Jean Bolte Fleurantin

[57] ABSTRACT

A new method is invented to assemble data into a data set, such as item list in an Internet shopping cart, on client side that is necessary for a transaction between two parties on the Internet server side and client side. The method is to arrange application logic and data access logic on both client side and server side according to execution efficiency to achieve optimal implementations of transactions. A web browser with a build-in engine that can execute client side application program, such as Netscape Navigator 3.0 or above, is needed to implement the method. Web pages used in the method are specifically designed in which client side application program written with script language, such as JavaScript, is embedded. Also a frame in a window, which is preferred, or a new window is created on client side as a data assembling monitor window. In addition, data needed for a transaction in web pages can be retrieved dynamically and individually and assembled with necessary user input in the monitor window by the client side application program actuated by users. In an assembling process, all or at least first two of following editing operations of adding, deleting, updating, entry check, calculation, and backup, are executed on client side until final submission, save, or print. An Internet Client Side Shopping Cart is used to illustrate how to implement this method by using HTML, JavaScript, and CGI. This method can also be used on a local area network and a metropolitan area network.

23 Claims, 8 Drawing Sheets

DYNAMIC DATA ASSEMBLING ON INTERNET CLIENT SIDE

BACKGROUND OF THE INVENTION

In recent years, the Internet has seen an explosive growth of all kinds of applications. In a relative short period, the Internet has grown from a static information delivery system to a full-blown interactive medium. As more and more information exchanges and business get online on the Internet, the congestion of the information traffic on the Internet is becoming more severe. This newly invented method, called Dynamic Data Assembling On Internet Client Side (DDAICS), is useful to assemble data retrieved from server side or from both client side and server side into a data set on Internet client side that is necessary for a transaction until final submission, save, or print. This method, if widely used, will cut down data transmissions, reduce load on servers, speed up information traffic, and save time and scarce resources for Internet users on the Internet.

In the traffic on the Internet, there are a lot of unnecessary transmissions of useful data, transmissions of useless data, and their overheads. Internet server side shopping cart (ISSSC) used by retailers and other firms, such as Wal-Mart Online(www.wal-mart.com), Netscape Store (merchant.netscape.com), Oracle Store (www.oracle.com), on the Internet at present is a typical example. For example, if a shopper wants to order only one item online, first his choice of the item and/or quantity is sent to the sever and put into the cart (one-way transmission). Then he has to retrieve this information back from the cart (two-way transmission). Finally the order form is sent to the server to complete this transaction. Here four one-way transmissions are needed. Also a lot of overheads, such as setting up a connection between a client computer and a server computer, closing the connection, and so on, occur associated with these transmissions.

A key shortcoming of ISSSCs is that they manage the shopping information on the server side, and every change of shopping information is recorded on the server side through transmissions of data to the server side on the Internet. This results in many unnecessary transmissions of useful data between client side and server side. If the data entered by a shopper is wrong, the data are also sent to the server and checked there. Then an error message is returned to the client side. This results in many unnecessary transmissions of useless data.

On the other hand, the newly invented method can be used to design an Internet client side shopping cart (ICSSC). If an ICSSC is used, a shopper can put the item into the cart on his computer. If that is the only item wanted, he can submit the order immediately. Here only one one-way transmission is needed to finish the transaction. As items the shopper order increase, the times of the transmissions by using ISSSCs also increase. Deletion, update, calculation of tax, data checking, and the like, will increase transmissions further. But with an ICSSC, no matter how many items a shopper order, only one transmission is enough. Here transmission of data refers to shopping data transmission in which the data record the shopper's choices of the items, quantity, tax, total price, and the like. Other data transmissions of Internet shopping, such as downloading the item lists, pictures, and introduction materials from server side to client side, are considered as same in both ICSSCs and ISSSCs.

Another example is large online documents such as government regulations, or other lengthy documents. In most cases, Internet users do not need the whole document, but only part of it is of the interest. If these documents are designed in such a way that after downloading of the whole document, every individual title, provision or paragraph of the document is retrievable and editable dynamically on client side, a user can use the "find" function of a browser to locate the title, provision, or paragraph of the interest, retrieve and put into an assembling monitor window on the screen of a client side computer. After all related materials are retrieved and assembled, users can save it as a new file or print it. This will save a lot of effects and resources of users used for editing, storing, or printing the whole document.

Still another example is online multiple-choice examinations or surveys. In fact, if there are four answers starting with a check box or a radio button for each question, only one of them chosen is of concern. If the answers are assembled on client side, three fourth of answers that are not chosen do not need to be submitted. With a little design effect, nearly three fourth of traffic volume can be cut down in these cases.

BRIEF SUMMARY OF THE INVENTION

The invented DDAICS method is an alternative diverse type of dynamic information retrieval, storage, and exchange method. Unlike those conventional Internet data retrieval and exchange methods on the Internet in which most application logic and data access logic are located on the server side, the newly invented DDAICS method is to arrange application logic and data access logic on both client side and server side according to execution efficiency to achieve optimal implementations of transactions. A web browser with a build-in engine that can execute client side application program, such as Netscape Navigator 3.0 or above, is needed to implement the method. Web pages used in the method are specifically designed in which client side application program, such as one written with JavaScript, is embedded. Also a frame in a window, which is preferred, or a new window is created on client side as a data assembling monitor window. In addition, data needed for a transaction in a web page must be designed in such a way that they can be retrieved dynamically and individually and assembled with necessary user input in the monitor window by the client side application program actuated by users. In an assembling process, all or some of editing operations, such as adding, deleting, updating, entry check, calculation, and backup, are executed on client side until final submission, save, or print. The philosophy behind the DDAICS method is that where execution efficiencies lie, where application logic and data access logic go.

One objective of using the DDAICS method in the Internet applications is to eliminate unnecessary transmissions of useful data by implementing all edit operations, such as adding, deleting, updating, entry check, calculation, and backup on client side in a data assembling process. Also transmissions of useless data will be reduced to minimum if data checking mechanism is well designed. As a result, the Internet information traffic will be reduced significantly if this method is widely used, and Internet traffic will speed up as a result of reduction of Internet traffic. Also load on servers will be reduced significantly. Overall result is that the scarce Internet resources will be used more effectively and efficiently.

Another objective is to reduce the time needed to assemble a data set needed to make a transaction on the Internet for Internet users. This objective is realized by dynamic data retrieval, storage, and editing on the client side until a data set needed for a transaction is assembled completely ready for submit, save, or print.

Still another objective is to make an online transaction a pleasant experience for Internet users instead of a tedious and time-consuming activity. Most Internet users are frustrated by slow traffic on the Internet and long waiting time. With very effect of all users on both server side and client side of the Internet, it is hopeful that the environment on the Internet will be improved.

BRIEF DESCRIPTION OF THE DRAWING

The present invention is embodied and illustrated by an ICSSC designed by using this invented method. For a more complete understanding of the drawings, the present invention and its advantages, reference should be made to the following DETAILED DESCRIPTION OF THE INVENTION taken in connection with the accompanying drawings and programs.

DETAILED DESCRIPTION OF THE INVENTION

Figure 1:
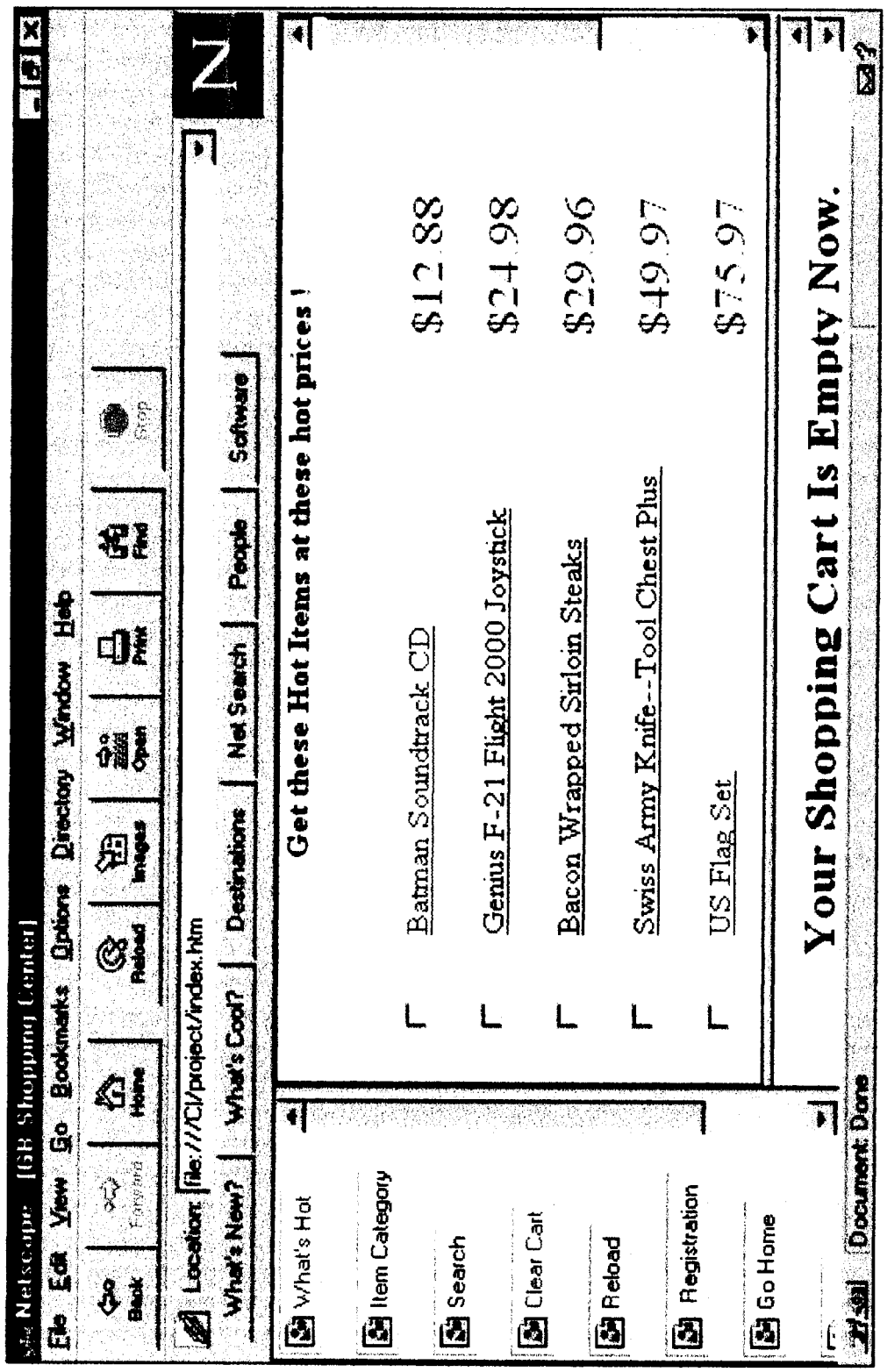
FIG. 1 shows that the client side window is divided into three frames by using frame tags in HTML. The frame on the left-hand side of the window is named as Control Panel, the upper frame on the right-hand side as Display Window, and the bottom frame on the right-hand side as Data Assembling Monitor Window. If the Data Assembling Monitor Window is used as a shopping cart, this frame is called Internet Client Side Shopping Cart.

First some terms used in this description are defined as follows to eliminate ambiguities:

Transaction—any activity conducted between two parties on client side and server side of a LAN, a MAN, or the Internet that involves data deliveries or data exchanges. Some examples are Internet shopping, online examination, online survey, and retrieval of information from server side.

Server party—the party on server side who offers information, services, or products, and/or retrieves information from client parties.

Client party—the party on client side who receives or wants to receive information, services, or products, and/or submits information to a server party.

datum—a meaningful character or a string of characters for both parties.

Key datum—a necessary datum for a transaction. For a shopping cart, the key data are name or ID number of items, and quantity.

Nonkey datum—unnecessary datum for a transaction but facilitating that transaction. For a shopping cart, the monkey data are total price, subtotal, grand total, and the like.

Data set—a well-organized and meaningful set of data for a transaction that includes all key data and nonkey data. Some examples are order forms, examination answer sheets, survey answer sheets.

Action of client party—clicking a mouse button, typing on a key, or other actions functioning the same.

client side application program—a program written with a script language or other computer language which is embedded or called in one or more web pages, executed on client side, and used for controls of editing operations of client parties, assembling the file of the web page for the Data Assembling Monitor Window on the fly and writing the file into that window on client side, creating of a new window as a data assembling monitor window, and/or implementing other functionality needed for a transaction and/or facilitating a transaction.

top file—a file that controls frame and/or window setting of client side screen directly or indirectly and contains all or part of client side application program.

Data file—a file that contains key data and nonkey data for a transaction.

Data Assembling Monitor Window—a frame in a window, or a window on client side in which the data set is dynamically assembled.

Display Window—a frame in a window or a window on client side in which data files and other files are displayed.

Control Panel—a frame or a window where functional buttons, links, and/or images are located. The imagines in this window function as buttons, links, or decorations.

Retrieve data individually—retrieve datum/data out piece by piece from a data file, but not retrieve the whole file.

Manually—using a mouse, a key board, or other instruments to control operations by client parties.

Automatically—actuating a computer program which controls operations.

LAN—local area network.

MAN—metropolitan area network.

Generally the DDAICS method includes the client side application program that implement following functionality:

Picking up datum/data dynamically and individually from a web page in a display window by client side application program actuated by an action of a client party, and checking if the selected datum/data are needed for a transaction. If needed, adding the selected datum/data to data assembling monitor window. Otherwise, taking other necessary actions. And being capable to do that from unlimited number of web pages fetched into the display window.

Adding other key data and nonkey data automatically and/or manually, and checking entries automatically in the data assembling monitor window.

Deleting datum/data from the data assembling monitor window.

Updating datum/data in the data assembling monitor window.

Calculating numeric datum/data in the data assembling monitor window.

Backing up datum/data in the data assembling monitor window automatically when a major change has occurred.

Submitting a data set to a server party, saving it as a file, or printing it on a client side printer. Before executing these actions, checking if all key data are present.

Assembling the file of the web page for the Data Assembling Monitor Window on the fly and writing the file into that window, and/or other functionality.

In one embodiment of the present invention, an Internet Client Side Shopping Cart (ICSSC) is used to illustrate how to implement this method by using HTML, JavaScript, CGI, and Netscape Navigator 3.0 or above. The top file has the structure as follows:

```
<HTML>
<HEAD>
<TITLE>GB Shopping Center</TITLE>
<SCRIPT LANGUAGE="JavaScript">
<!-- start
//Put JavaScript client side application program here!!!
// end-->
</SCRIPT>
</HEAD>
<FRAMESET COLS="20%,*">
<FRAME NAME="control" SRC="html/control.html" MARGINHEIGHT=2 MARGINWIDTH=1>
    <FRAMESET ROWS="80%,*">
        <FRAME NAME="display"SRC="html/whatsHot.html">
        <FRAME NAME="cart" SRC="html/clearCart.html" onLoad="reload()" onUnload="backup()">
    </FRAMESET>
</FRAMESET>
</HTML>
```

When this top file is loaded, the screen on client side is shown in FIG 1. JavaScript functions must be put between HTML tags "<SCRIPT LANGUAGE='JavaScript'>" and "</SCRIPT>". The functions must also be between HTML comment tags "<!--"and "-->". The following functions introduced in this section are all put between these tags except noted otherwise.

Figure 7:
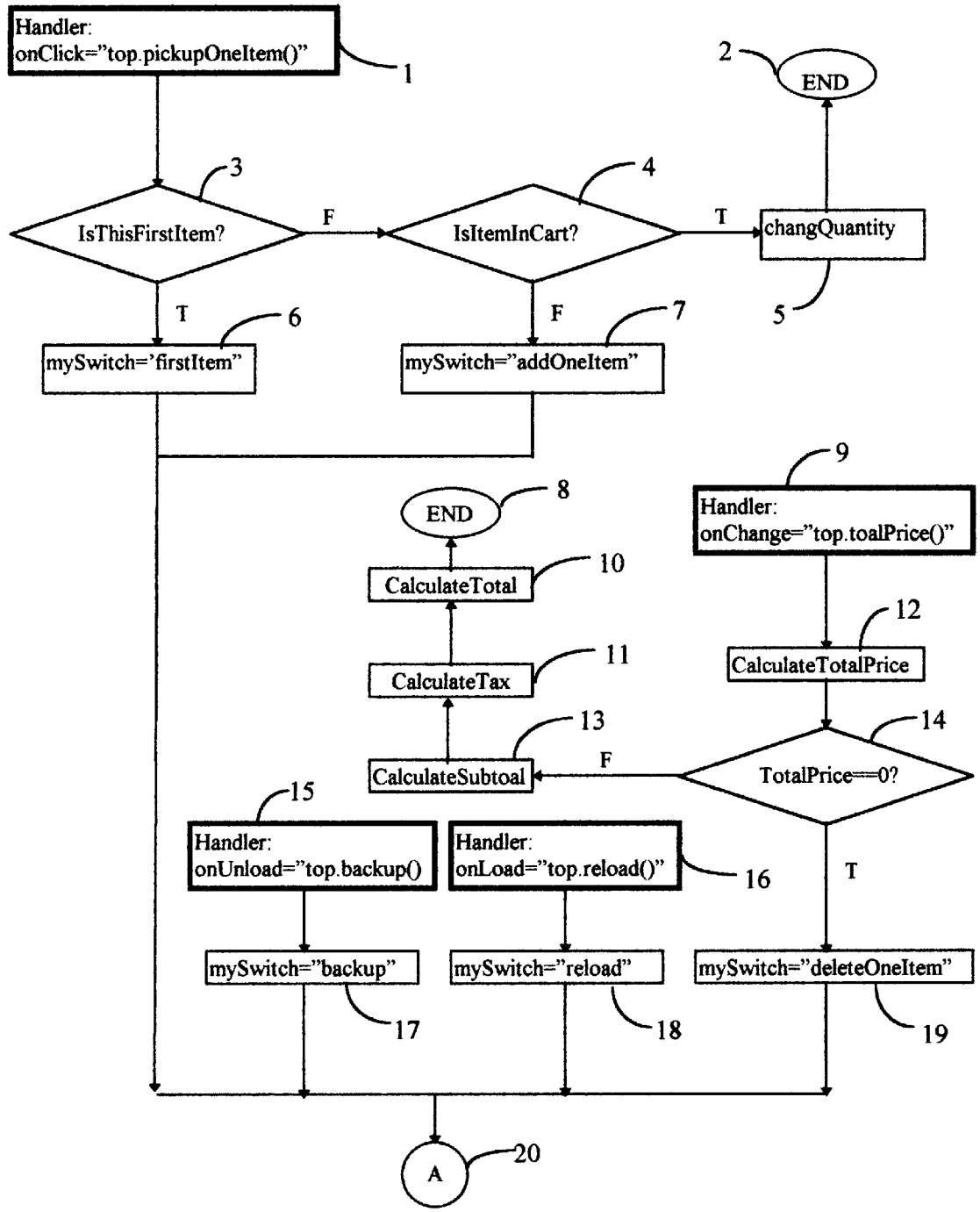
FIG. 7 is a part of the flow chart of the client side application program for the ICSSC that is connected to the flow chart in FIG. 8 at point marked as circle A 20.

It should be noted that two handlers are assigned with the shopping cart frame, onLoad="reload()"16 onUnload="backup()"15 which are also shown in FIG. 7. It is found that when returning from visiting some other web sites by using Netscape Communicator 4.0, the characters in the shopping cart frame become unrecognizable characters. The two handlers here is to prevent that from happening by backing up and reloading the web page for the shopping cart frame. Also "reload" button on the Control Panel shown in FIG. 1 can be clicked to reload the backup copy of the web page for the shopping cart frame.

On the Control Panel shown in FIG. 1, the control buttons is designed to control some major operations, such as fetching hot item list, search engine, and so on, to the Display Window, and deleting all items in the shopping cart by fetching a HTML file, named as "clearCart.htm", with header "Your Shopping Cart is Empty Now" and no other content.

In the Display Window shown in FIG. 1, the item list or other HTML files can be displayed there. These files can be fetched from static HTML files on server side, and also from files produced on the fly by server side CGI programs which take data from item database or other files, or by client side application program.

In the Display Window in FIG. 1, the item list is arranged in three columns. The first column is check boxes. If Internet shoppers want an item, by clicking in a box, the item named on the right of the clicked box will be added into the shopping cart at the bottom of the screen. The second column is items' names that also serve as links. By clicking on a link, a web page with pictures and/or introduction about the item can be fetched into the Display Window. The third column lists prices of items.

Figure 4:
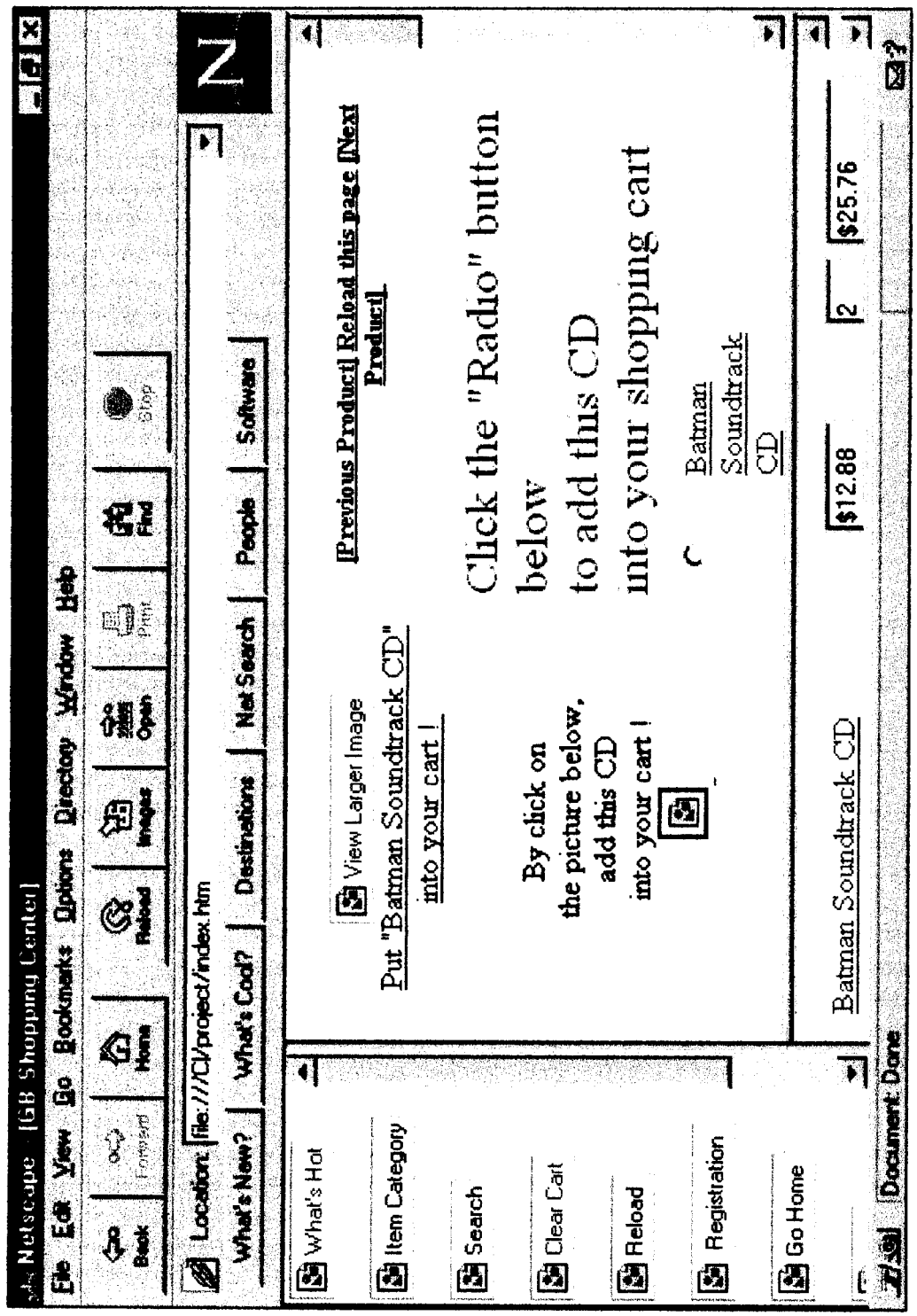
FIG. 4 illustrates three other ways to select an item and drop it into the shopping cart.

By clicking on the link "Batman Soundtrack CD" in the Display Window of FIG. 1, a web page is fetched into the Display Window that can be used to show the picture and detailed introduction about this item as shown in FIG. 4.

The following HTML code taken from "whatsHot.htm" file serves best to illustrate the item list design in the Display Window.

```
<FORM NAME=formForDisplay>
<TABLE BORDER="0" CELLPADDING="5" CELLSPACING="5" WIDTH="462">
    <TR>
        <TD VALIGN=TOP WIDTH="6">
            <P ALIGN="LEFT">
<!-In the "box" below, the arguments in the function"top.pickup()" Are (item ID, item name, unit price, order number of the link
". . ./html/item00.htm" in this homepage starting from zero)
->
            <INPUT TYPE=CHECKBOX NAME=box onClock="top.pickupOneItem('0001','Batman Soundtrack CD','$12.88',0)"></A>
        </TD>
        <VALIGN=TOP WIDTH="280">
            <A HREF=". . ./html/item00.html"TARGET="display"> Batman Soundtrack CD</A>
        </TD>
        <TD VALIGN=TOP WIDTH="111">
            <FONT SIZE="5" COLOR="#AF0000">$12.88</FONT>
        </TD>
    </TR>
```

```
//list all other items below.
</TABLE>
</FORM>
```

The important information about the item is assigned as the arguments of the handler function "onClick= top.pickupOneItem('0001','Batman Soundtrack CD', '$12.88'0)"1. The four arguments of the handler function are item ID, item name, unit price, order number of the link "../html/item00.html" in all links of this homepage starting from zero. Upon an Internet shopper click on the check box, these four arguments will be passed to the handler function "pickupOneItem()"1 which is in the top file. Generally you can also assign these items' attributes with any object, or object's properties in a web page, as long as these object, or objects' properties are retrievable with client side application program.

Figure 2:
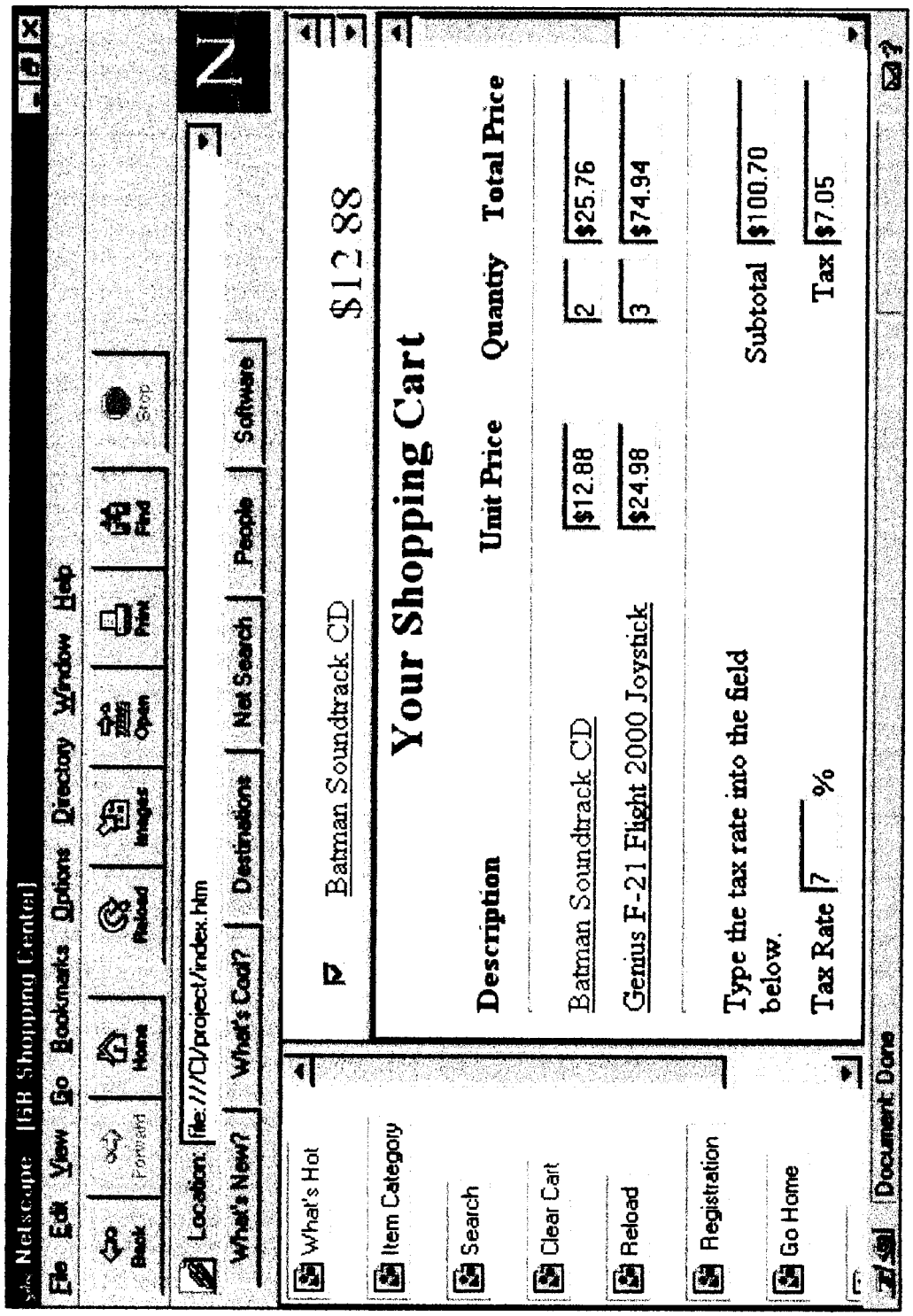
FIG. 2 shows the client side shopping cart with selected items in the shopping cart. By clicking on the check boxes, as shown in the Display Window, the selected items are dropped into the shopping cart automatically.
Figure 3:
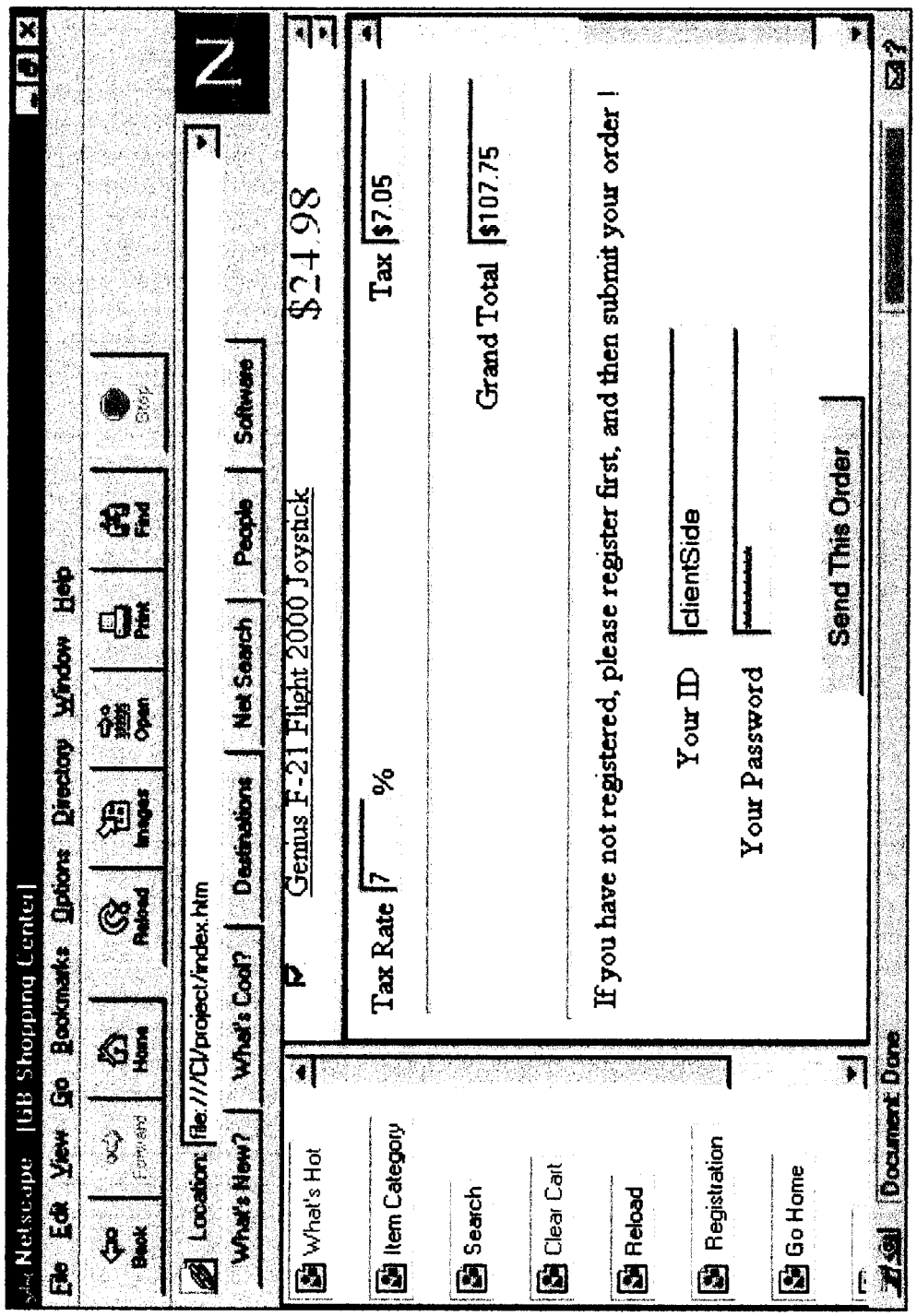
FIG. 3 shows the bottom part of the shopping cart. By clicking on the button "Send This Order", the order will be sent to the server side.

In FIG. 2 and FIG 3, two items have been selected and dropped into the shopping cart. The default quantity for items is one, but a shopper can change that at any time by focusing on the quantity cell and typing in a new number in the shopping cart. The shopper can also type in the tax rate if applicable into the tax rate cell. The total prices, subtotal, tax, and grand total are calculated automatically by client side application program. After finishing shopping, shoppers can put user ID and password in the shopping cart and submit the order by clicking on the button "Send This Order". If a shopper have not registered, by clicking on the "Registration" button on the Control Panel, a registration form will show up in the Display Window. After registration, the shopper can submit the order.

In the Display Window of FIG. 4, for illustration purpose, a link "Put 'Batman Soundtrack CD' into your cart!", a picture, and a radio button are designed into this web page which introduces "Batman Soundtrack CD". By clicking on any one of these three objects, the item will be dropped into the cart. The HTML statements for these three objects are "Search" on the Control Panel. This is an example that a web page is created on the fly by client side application program. The search engine can be used to search the store and display an item list in a same format as shown in the Display Window in FIG. 1. The button "What's Hot" and "Item Category" in the Control Panel are also designed for the same purpose to list items.

Figure 6:
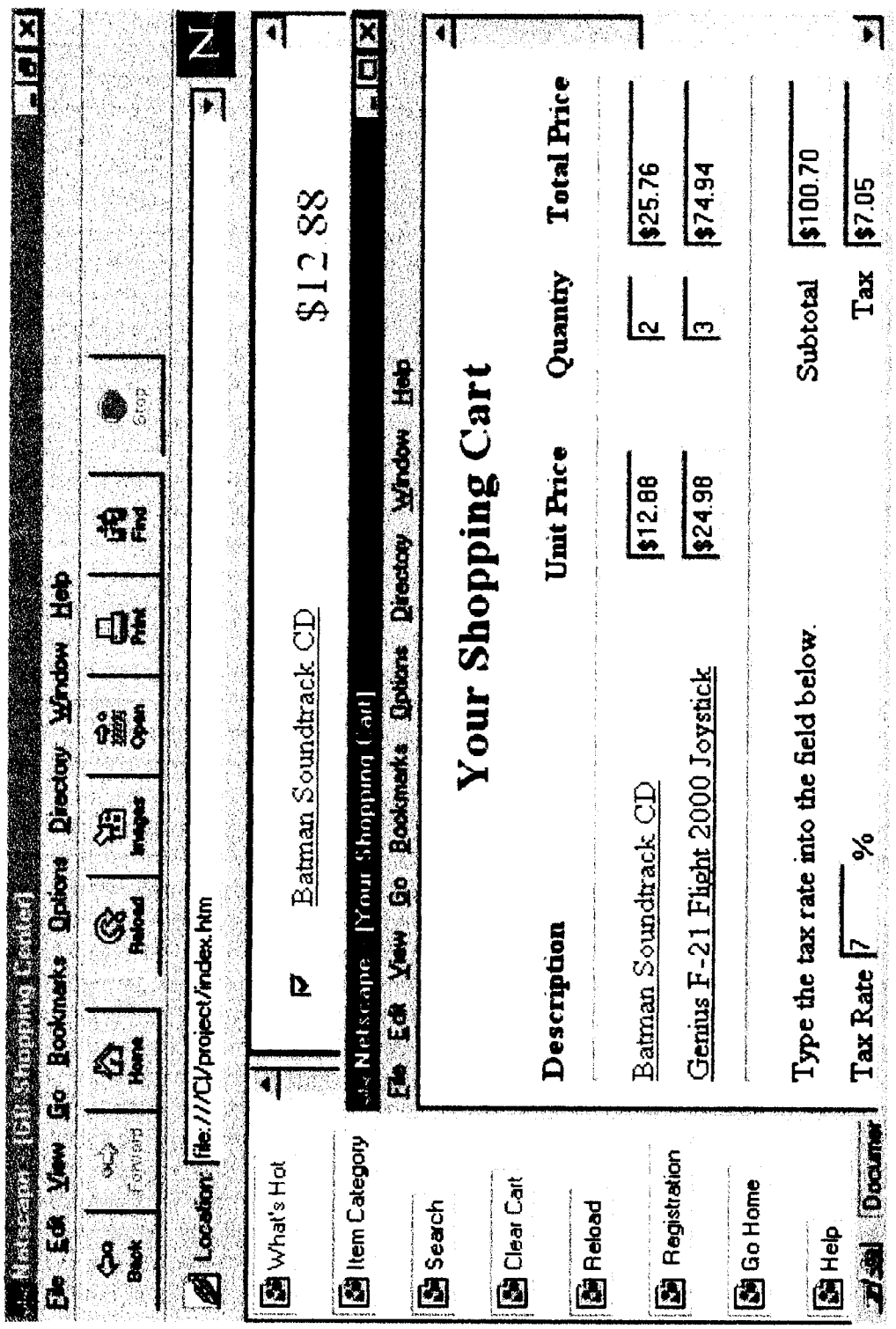
FIG. 6 shows that a new window created on the fly is used as a client side shopping cart instead of using a frame as the shopping cart as shown in FIG. 1.

FIG. 6 shows that a new window created on the fly by the client side application program is used as a client side shopping cart instead of using a flame as the shopping cart as shown in FIG. 1. The major difference between using a frame as a shopping cart and using a new window as a shopping cart is that reference from top file, Control Panel, and Display Window to the shopping cart and backwards is different. For example, referencing to an object in the frame shopping cart, named as "cart", from top file, "top.cart objectName" is used, but to an object in the window shopping cart named as "newWindow", "newWindow.objectName" is used. If referencing to a function in the top file from the frame shopping cart, "top.functionName" is used, but from the window shopping cart, "self.opener.functionName" is used.

Figure 8:
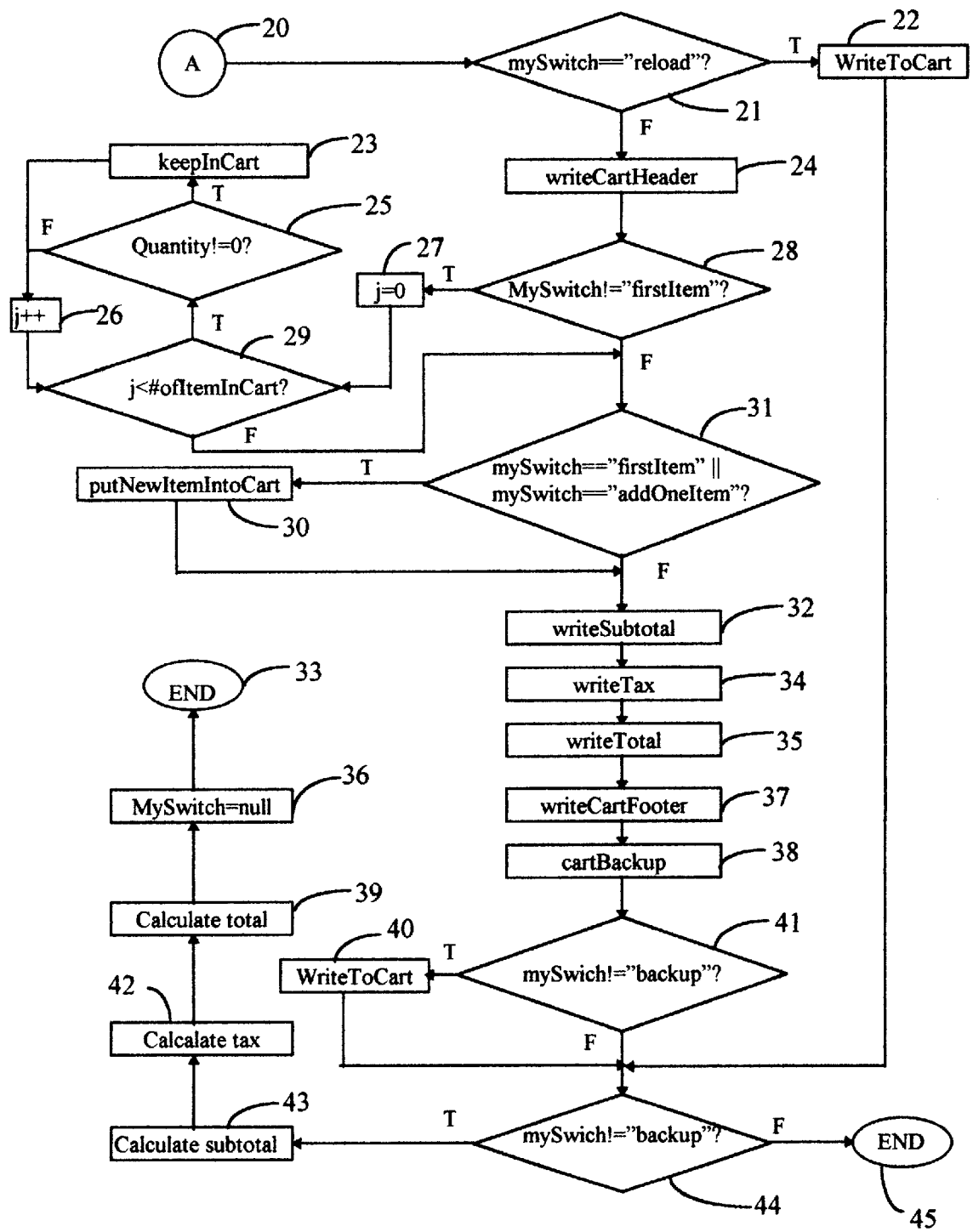
FIG. 8 is the rest of the flow chart of the client side application program for the ICSSC.

FIG. 7 and FIG. 8 illustrate, in logical flow, the functions performed by the client side application program in implementing the present invention and are hereinafter referred to in connection with the following description of exemplary operations of the Internet client side shopping cart In operation, the top file and the web pages associated with each flame of the window are downloaded by a user with a browser, such as Netscape Navigator 3.0, as shown in FIG. 1. The client side application program of JavaScript is

```
<A HREF="javascript: top.pickupOneItem('0001',Batman Soundtrack CD','$12.88',4)">Put
"Batman Soundtrack CD" into your cart !<A>
By click on <BR>the picture below,<BR>add this CD<BR>into your cart !<BR><A
HREF="javascript: top.pickupOneItem('0001','Batman Soundtrack CD','$12.88',4)"><IMG
SRC=". . . /images/buttons/buyit.gif"><A>
<INPUT TYPE=RADIO NAME=radio onClick="top.pickupOneItem('0001','Batman
Soundtrack CD','$12.88',4)">
<A HREF=". . ./html/item00.html" TARGET="display">Batman Soundtrack CD<A>
```

Buttons can also be used for that purpose. In a real application, one of them is enough in an introduction file for one item.

Figure 5:
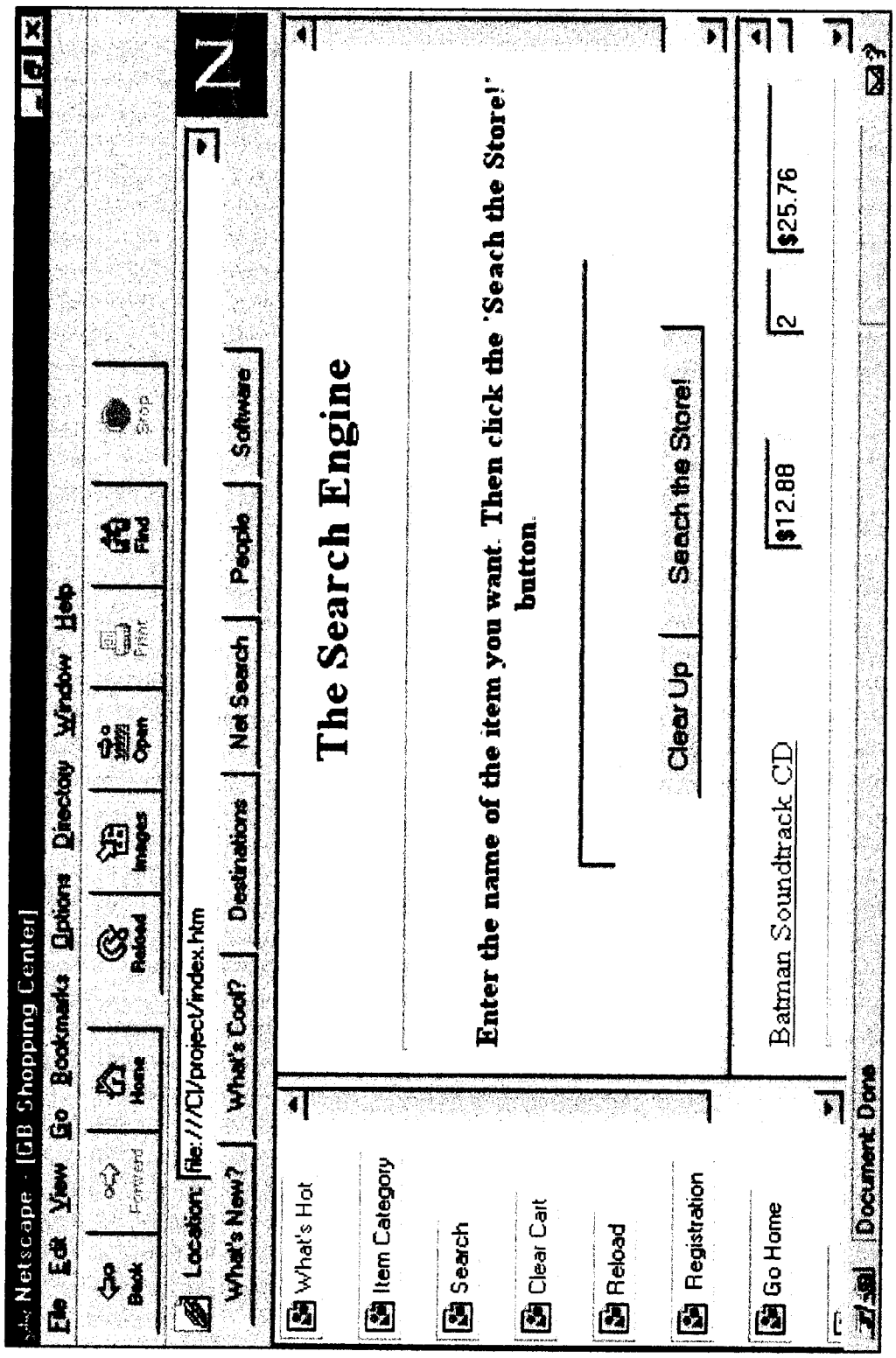
FIG. 5 is a web page for a search engine displayed on the Display Window and created on the fly by clicking on the button "Search" on the Control Panel.

FIG. 5 shows a search engine displayed on the Display Window and created on the fly by clicking on the button compiled by the build-in JavaScript compiler of the browser. If a user clicks a check box in the Display Window in FIG. 1, function "top.pickupOneItem()" in top file is actuated by handler "onClick" 1. The function "top.pickupOneItem()" is listed below.

```
//This function adds a new item into the cart. It also checks if the newly added item
//is already in the cart. If so, it will focus on the quantity field of that item in the cart.
//Then user can change the quantity there.
function pickupOneItem(itemID,itemName,unitePrice,linkOrderNum) {
    //store item ID, itemName, unit price, and order number of the link
    //in a array "numberName".
    //Order number of links in a web page starting from zero. Of the four parameters,
    //the first is put into numberName[0], second into numberName[1], and so on.
    numberName=new Array()
```

-continued

```
        numberName[0]=itemID
        numberName[1]=itemName
        numberName[2]=unitePrice
        numberName[3]=linkOrderNum
        if(top.cart.document.links.length =≦0) {
        //This is the first item which is put into shopping cart if true.
            opSwitchBoard("firstItem", numberName)
        }
        else {
        //there are some items already in the cart.
                var numOfItemInCart=parseInt(top.cart.document.links.length)
                var repeatItem=false
                for (var i = 0; i < numOfItemInCart;i++) {
                    if (numberName[1] == top.cart.document.formForCart.elements[i*3].name) {
                    //check if the newly added item is already in the shopping cart.
                        alert("This item is already in your cart! If you want more, change the
Quantity, please!")
                        top.cart.document.formForCart.elements[i*3+1].focus()
                        repeatItem=true
                    }
                }
                if(!repeatItem) {
                //the newly added item is not in the shopping cart.
                    opSwitchBoard("addOneItem",numberName)
                }
        }
}
```

In the shopping cart as shown in FIG. 2, each item name is also used as a link to a web page that introduce the item in details. This feature can be used to determine if there is any item in the shopping cart by the condition "top.cart.document.links.length=0". If it is true, there is no item in the shopping cart. Another way to do that is to put an empty form into file "clearCart.html" with the statement "<FORM NAME=formForCart></FORM>" in the body of the file. So the condition "top.cart.document.formForCart.elemetns.length=0", can also be used for the same purpose. In the condition expressions above, "cart" is the name of the shopping cart frame. For other terms, see JavaScript references.

A determination is made at block 3 whether or not this is the first item selected. If it is the first item selected, a variable as a flag, named "mySwitch", is assigned a string "firstItem". If it is not, another determination is made at block 4 whether or not the selected item is already in the shopping cart. If it is, the cursor automatically focuses on the Quantity cell of the item in the shopping cart 5, users can make a decision to change quantity of the item or not. If no change is made, the program ends 2. If a change occurs, another function "top.totalPrice()" is actuated by an "onChange" handler 9. Now come back to block 4. If the item selected is not in the shopping cart, "mySwitch" is assigned a string "addOneItem".

The flag string "firstItem" or "addOneItem" is then passed to the function "opSwitchBoard()" together with array "numberName" that contains information about the selected item, see above code of the function "top.pickupOneItem()". The function "opSwitchBoard()" is listed below.

```
function opSwitchBoard(mySwitch, numberName) {
    if(mySwitch=="reload") {
        writeToCart(cartBackup)
    }
    else {
        var cart=writeToVarCart(mySwitch, numberName)
        if(mySwitch!="backup")
            writeToCart(cart)
    }
```

-continued

```
    if(mySwitch!="backup") {
        calcSubtotal()
        calcTax()
        calcTotal()
        mySwitch=null
    }
}
```

The flow chart on FIG. 7 and FIG. 8 joins together at circle A 20. Two variables, "mySwitch" and "cartBackup", used in above code are global variables. The variable "cart" is a local variable. The variable "cart" is used to store the whole file of the web page for the shopping cart that is created by the client side application program on the fly. The global variable "cartBackup" is used to store the most recent copy of the content of the variable "cart". It is important to note that the whole file of the web page for the shopping cart is assembled into variable "cart" before writing or rewriting to the shopping cart frame. The function calls, "writeToCart (cardBackup)" 22 and "writeToCart(cart)" 40 in above code are used for implementing this final writing. The called function itself is shown as follows.

```
function writeToCart(cart){
    top.cart.document.open()
    top.cart.document.write(cart)
    top.cart.document.close()
}
```

Block 21 is first determination block in the function "opSwitchBoard(mySwitch, numberName)" above. If it is false, the program begin to write the file of the web page for the shopping cart into variable "cart". Function "writeToVarCart(mySwitch, numberName)" below is called first.

```
//this function write a web page for the cart, but put the content of the page into a variable "cart"
first.
function writeToVarCart(mySwitch, numberName) {
    var cart=writeCartHeader()
    if(mySwitch!="firstItem") {
        cart+=keepOldItemsInCart()
    }
    if(mySwitch=="firstItem" || mySwitch=="addOneItem") {
        cart+= putNewItemIntoCart(numberName)
    }
    cart+= writeSubtotal()
    cart+= writeTax()
    cart+= writeTotal()
    cart+= writeCartFooter()
    cartBackup=cart    //backup the content of the web page for the cart.
    return cart
}
```

First the header is written 24. The following code is to do the job.

```
//Function that write a head, a title, a form title, etc. of a web page on the fly. The web page is used as
//a client side shopping cart and displayed in the shopping cart frame when completed.
function writeCartHeader() {
    var cart ="<HTML><HEAD><TITLE>
    cart +="Your Shopping Cart</TITLE></HEAD>"
    cart +="<BODY>"
    cart +="<center><h2><hold>Your Shopping Cart<h2></bold><(center>"
    cart +="<P><FORM NAME='formForCart' ACTION='http://URL of CGI program which receives the
submitted form' METHOD='POST' TARGET='display'>"
    cart +="<TABLE BORDER=0 WIDTH='100%'>"
    cart +="<TR>"
    cart +="<VALIGN=TOP WIDTH='100%'>"
    cart +="<TH ALIGN=LEFT>Description</TH>"
    cart +="<TH ALIGN=RIGHT>Unit Price</TH>"
    cart +="<TH ALIGN=RIGHT>Quantity</TH>"
    cart +="<TH ALIGN=RIGHT>Total Price</TH>"
    cart +="</TR>"
    cart += writeHrOrBlankLine("HR")
    return cart
}
```

Note that the form in the shopping cart is named as "formForCart". The "ACTION" of the form refers to a CGI program that will retrieve the data in the form of the shopping cart, and write the data to the file or database on the server side. The four column titles are Description (item's name), Unit Price, Quantity, Total Price. See FIG. 2 for details. The function call "writeHrOrBlankLine("HR")" in above code write a horizontal rule if "HR" is passed to the called function. If no argument is passed, a blank line is written into the shopping cart At block 28, the flag "mySwitch" is checked against "firstItem". If "mySwitch" equals "firstItem", then at block 31 the condition is also true. The first item is dropped into the shopping cart 30. The following function "putNewItemIntoCart(numberName)" is to do the job.

```
function putNewItemIntoCart(numberName){
    //In the cart, first column is item name with a link to homepage that introduce the item.
    var cart ="<TR><TD><A HREF="+top.display.document.links[parseInt(numberName[3])]+"
TARGET='display'>"
    cart +=numberName[1]+"</A>"+"</TD>"
    //The second column is unit price. Its type is text of form with NAME=item name and
    /VALUE=unite price
    cart +="TD ALIGN=RIGHT><INPUT TYPE=TEXT NAME=\'"+numberName[1]
    cart +="\'VALUE=\'"+numberName[2]+ "\' SIZE=6 onFocus=top.cartWarning(this)>"+">/TD>"
    //The third column is the quantity. Its type is text of form with NAME=item ID and
    //VALUE=quantity.CGI program on server side should retrieve this pair of data to form the order
    cart +="<TD ALIGN=RIGHT><INPUT TYPE=text NAME=\'"+numberName[0]
    cart+="\'VALUE='1' onChange='top.totalPrice(this, this.form)'SIZE=3></TD>"
    //The forth column is total price. Its type is text of form with NAME='totalPrice' and
    //VALUE=total price
    cart +="<TD ALIGN=RIGHT><INPUT TYPE=TEXT NAME=totalPrice VALUE=\'"+
```

-continued

```
numberName[2]+"\'SIZE=10 onFocus=top.cartWarning(this)></TD>"
    cart +="</TR>"
    return cart
}
```

In the above code, "top.display.document.links[ParseInt(numberName[3])]" is used to retrieve the link object in the Display Window which holds a URL for a web page that introduces the item in details. Also note that how the item ID, item name, and unit price are assigned as objects' names and values that are retrievable individually by the client side application program later if needed. After put the first item into the variable "cart" 30, the programs continue to write subtotal 32, tax 34, total 35, and footer 37 into the variable "cart". Then a copy of the variable "cart" is stored into the global variable "cartBackup" 38. Because it is the first item, the logic flow of the program goes from block 41 to block 40, and finally the shopping cart frame is written with a web page for the first item. The default quantity of the item is one. Shoppers can change the quantity at any time in the shopping cart, and the total price will be recalculated. The new values in the text cells of the shopping cart can be written by the client side application program without causing the whole file of the web page for the shopping cart to be rewritten. This is a relative new feature of Netscape Navigator 3.0 and above. Functions such as "calcTotalPrice()" 12, "calcSubtotal()" 43, "calcTax()" 42, and "calcTotal()" 39 in top file all take the advantage of this feature, and make the update operations easier. On the other hand, if an item is added or deleted from the shopping cart' the whole file of the web page for the shopping cart has to be rewritten if Netscape Navigator 3.0 or Communicator 4.0 is used.

Function calcSubtotal() is listed below.

```
//subtotal=sum of all totalPrice
function calcSubtotal() {
    var numOfItemInCart=parseInt(top.cart.document.links.length)
    var subtotal=0
    var value=""
    for (var i = 0; i < numOfItemInCart; i++){
    //calculate the sum of the totalPrice
        value=top.cart.document.formForCart.elements[i*3+2].value//total price for each item
        value= deleteString(value,"$")    //delete "$" from money value
        value= parseFloat(value)          //change to float number
        subtotal+=value                   //sum up total price
    }
    subtotal=formatNum(subtotal,2)        //keep only two digit after the decimal point
    top.cart.document.formForCart.elements[numOfItemInCart*3].value ="$"+subtotal //write back to the
shopping cart frame
    calcTax()
    calcTotal()
}
```

In this function, there are a few utility functions to implement number and string manipulations. In JavaScript reference books, one can get information on how to write them.

If a new item is added into the cart, the whole HTML file for the cart has to be rewritten. First the data of the items already in the cart has to be retrieved into variable "cart", and then the data of the newly added item. Then put the old items into the cart (write the part of web page for the shopping cart on the old items), and then add the new item. The following function is to retrieve data on the old items already in the shopping cart, and then put into the variable "cart" again before adding the new item.

```
//This function put the data of the items already in the shopping cart at the top of the cart
//when new item is added.
function keepOldItemsInCart() {
    var numOfItemInCart=parseInt(top.cart.document.links.length)
    var cart=""
    for (var j = 0; j<numOfItemInCart; j++) {
        if(top.cart.document.formForCart.elements[j*3+1].value !="0") {
        //put the old items into the cart if quantity !=0
            cart +="<TR><TD><A HREF=\""+top.cart.document.links[j]
            cart +="\'TARGET=display>"
            cart +=top.cart.document.formForCart.elements[j*3].name+"+"</TD>"
            cart +="<TH ALIGN=RIGHT><INPUT TYPE=TEXT NAME=\""+ top.cart.document.
formForCart.elements∂j*3].name
            cart +="\'VALUE=\""top.cart.document.formForCart.elements[j*3.].value
            cart +="\' SIZE=6 onFocus=top.cartWarning(this)>" +"</TD>"M
            cart +="TD ALIGN=RIGHT><INPUT type=text name=\""+ top.cart.document.
formForCart.elements[j*3+1].name
            cart +="\' VALUE=\""+top.cart.document.formForCart.elements[j*3+1].value +"\'size=3
onChange='top.totalPrice(this, this.form)'></TD>"
            cart +="<TD ALIGN=RIGHT><INPUT TYPE=TEXT NAME=totalPrice"
            cart +="VALUE=\""+top.cart.document.formForCart.elements[j*3+2].value+"\' SIZE=10"
            cart +="onFocus=top.cartWarning(this)></TD>"
            cart +="/TR>"
        }
    }
    return cart
}
```

In this function, how many items in the cart are first detected by the JavaScript statement "var numOfItemInCart =parseInt(top.cart.document.links.length)". This number is used in block 29 to control the loop. Because of each link in the cart corresponding one item, the number of links is equal to the number of the items in the cart. Another reason to put the links in the cart is that shoppers can check the item information at any time by fetching the linked web page into the Display Window without any browsing, see FIG. 4. Also note how links, item IDs, item names, unite prices, and quantities are retrieved individually and put on the top the shopping cart before adding a new item.

Before putting each old item into the cart, the Quantity of the item is checked against zero 25. If shoppers put the quantity of an item in the cart to zero, total price for that item is recalculated automatically 9, 12. When the total price of the item is zero, the function will not put it into the cart again. So that the item is automatically deleted 14, 19. This function is triggered whenever shoppers put the quantity of an item to zero by the event handler "onChange= ""top.totalPrice" 9.

Another important point is that Netscape Navigator treats check box, text cell, text area, buttons in a form as elements but links. So for item j in the cart item list, element[j*3] refers to unite price cell of item j, elements[j*3+1] refers to quantity cell of item j, and elements[j* 3+2] refers to total price cell of item j, see FIG. 2. Another feature is that elements and links are counted staring from 0. This is typical C and C++ program languages' feature.

When the use try to change the values in the unite price cell, total price cell, subtotal cell, tax cell, and total cell by clicking on the cell, the following function first changes the cell in the shopping cart to blur, and then gives an alert to users that "You can't change this cell by yourself !". In this way, all of this kind of trying will be screened out.

```
//Screen out all illegal effects to changes unit price, total price, and so on.
function cartWarning(thisPoint) {
    var length=top.cart.document.formForCart.elements.length
    for(var i = 0; i <length; i++) {
        if(thisPoint.name==top.cart.document.formForCart.elements[i].name) {
        //check which cell the user is clicking on, and make it unaccessible
            top.cart.document.formForCart.elements[i].blur()
        }
    }
    alert("You can't change this field by yourself!")
}
```

For the quantity cell, only positive integer is allowed. For the tax rate cell, only positive number is allowed. For the user ID and password cells, only number and alphabetic characters are allowed. If an illegal character is entered, an alert will be shown up on screen to remind users to change to the legal character sets.

If users change the Quantity of an item in the shopping cart 9, total price will be recalculated 12. If the total price is not equal to zero 14, subtotal, tax, grand total will be automatically updated 13, 12, 10. Then the program ends 8. Also every time when a new item is added, an item is deleted from the shopping cart, or the web page for the shopping cart is reloaded, subtotal, tax, grand total will be automatically updated 42, 39, 36.

In this shopping cart design, the data assembling monitor window using a frame as a shopping cart is set by the top file directly with HTML frame tags. Also the HTML file assigned to a frame by the top file can set subframes. If a new window is to be used as a data assembling monitor window, the window can be set by the top file indirectly with the embedded client side application program.

When the data set in the shopping cart is ready to be submitted, CGI programs on the server side can do rest of the job for the transaction. After receiving the submitted data set, CGI program can make some necessary checks. If every thing seems to be right, the data set can then be saved in a file or a data base. Because CGI program design is already in the conventional category of the art for programmers, no further description is made here.

The client side application program in this shopping cart application is written with JavaScript. Other languages, such as JScript, VBScript, combination of JavaScript and Java through LiveConnection, etc., and their future versions, can also used to program the client side application programs. Even some new computer languages may be created to do the job in future.

As shown by the Internet client side shopping cart design in this description, programmers have the enormous flexibility to design various Internet client side application programs just as they do in the Internet server side. With well-designed web pages and CGI programs on the Internet server side, plus well-designed Internet client side application programs, the Internet will be a more interesting place for people to visit.

Some functions that are not cited in above description are listed below. All these functions cab be embedded in the top file in any order. Some or all of these functions can also be embedded in other file or files, but reference must be changed accordingly. There are a few utility functions not listed in this description that implement number and string manipulations. In JavaScript reference books, normally skilled programmers familiar with JavaScript can get information on how to write them and easily write them by themselves.

```
// function to check if the input is a valid number
function isValidNumber(inputStr) {
    if (isEmpty(inputStr)) {
        alert("Please enter a number into the field !")
        return false
    }
    else {
        if (!isNumber(inputStr)) {
            alert("Please make sure entry is a number!")
            return false
        }
    }
    return true
}
// function to check if the input is a valid positive number
function isValidPosNumber(inputStr) {
    if (isEmpty(inputStr)) {
        alert("Please enter a positive number into the field !")
        return false
    }
    else {
        if (!isPosNumber(inputStr)) {
            alert("Please make sure entries is a positive number!")
            return false
        }
    }
    return true
}
// function to check if the input is a valid positive integer
function isValidPosInteger(inputStr) {
    if (isEmpty(inputStr)) {
        alert("Please enter a positive integer into the field !")
        return false
    }
    else {
        if(!isPosInteger(inputStr)) {
            alert("Please make sure entries is a positive integer!")
            return false
        }
    }
    return true
}
function isValidAlpha(inputStr) {
    if (isEmpty(inputStr)) {
        alert("Please enter letters.")
        return false
    }
    else {
        if (!isAlpha(inputStr)) {
            alert("Please make sure entries are letters only.")
            return false
        }
    }
    return true
}
function isValidAlphaNum(inputStr) {
    if (isEmpty(inputStr)) {
        alert("Please enter letters or number or their combination.")
        return false
    }
```

```
        else {
            if (!isAlphaNum(inputStr)) {
                alert("Please make sure entries are letters or number or their combination.")
                return false
            }
        }
        return true
}
//Checking user's ID and password
function isValidIDPasswd( ) {
    var length=top.cart.document.formForCart.elements.length
    var ID = top.cart.document.formForCart.elements[length-3].value
    var passwd = top.cart.document.formForCart.elements[length-2].value
    if (isEmpty(ID) || isEmpty(passwd)) {
        alert("Your ID and/or Password is Empty !")
    }
    else {
        if ((!isValidAlphaNum(ID) )||( !isValidAlphaNum(passwd))){
            alert("check your ID and Password, Please !")
        }
        else {
            top.cart.document.formForCart.submit( )
        }
    }
}
function writeSubtotal( ) {
    var cart =writeHrOrBlankLine("HR")
    cart += writeHrOrBlankLine(" ")
    cart +="<TR>"
    cart +="<TD ALIGN=LEFT> Type the tax rate into the field below.</TD>"
    cart +="<TD ALIGN=RIGHT> </TD>"
    cart +="<TD ALIGN=RIGHT> Subtotal </TD>"
    cart +="<TD ALIGN=RIGHT><INPUT TYPE=TEST NAME=subtotal VALUE='' SIZE=10
onFocus=top.cartWarning(this)></TD>"
    cart +="</TR>"
    return cart
}
function writeTax( ) {
    var taxRate=parseInt(0)
    var numOfItemInCart=parseInt(top.cart.document.links.length)
    if ( numOfItemInCart>0) {
    //if tax rate is entered, retrieve it, and write it into the cart again when update.
        taxRate= top.cart.document.formForCart.elements[numOfItemInCart*3+1].value
    }
    var cart ="<TR>"
    cart +="<TD ALIGN=LEFT>Tax Rate<INPUT TYPE=TEST NAME='taxRate'VALUE='' + taxRate
+ " SIZE=5 onChange=top.calcTax( )>% </TD>"
    cart +="<TD ALIGN=RIGHT> </TD>"
    cart +="<TD ALIGN=RIGHT>Tax</TD>"
    cart +="<TD ALIGN=RIGHT><INPUT TYPE=TEST NAME=tax VALUE='' SIZE=10
onFocus=top.cartWarning(this)></TD>"
    cart +="</TR>"
    return cart
}
function writeTotal( ) {
    var cart =writeHrOrBlankLine("HR")
    cart +=writeHrOrBlankLine(" ")
    cart +="<TR>"
    cart +="<TD ALIGN=LEFT> </TD>"
    cart +="<TD ALIGN=RIGHT> </TD>"
    cart +="<TD ALIGN=RIGHT> Grand Total </TD>"
    cart +="<TD ALIGN=RIGHT><INPUT TYPE=TEST NAME=total VALUE='' SIZE=10
onFocus=top.cartWarning(this)></TD>"
    cart +="</TR>"
    return cart
}
function writeCartFooter( ) {
    var yourID=" "
    var yourPassword=" "
    var numOfItemInCart=parseInt(top.cart.document.links.length)
    if ( numOfItemInCart>0) {
    //if users have entered user ID and password, keep them
        yourID= top.cart.document.formForCart.elements[numOfItemInCart*3+4].value
        yourPassword= top.cart.document.formForCart.elements[numOfItemInCart*3+5].value
    }
    var cart ="</TABLE></CENTER>"
    cart +="<br><hr>"
    cart +="<CENTER> If you have not registered, please register first, and then submit your order !
<br><br>"
    cart +="<TABLE BORDER=0 WIDTH='100%'>"
```

```
cart +="<TR>"
    cart +="<TD ALIGN=LEFT></TD>"
    cart +="<TD ALIGN=RIGHT> Your ID </TD>"
    cart +="<TD ALIGN=RIGHT></TD>"
    cart +="<TD ALIGN=LEFT><INPUT TYPE='TEXT' NAME='userID'
VALUE=\'"+yourID+"\'onChange='top.isValidAlphaNum(this.value)'> </TD>"
    cart +="</TR>"
    cart += writeHrOrBlankLine(" ")
    cart +="<TD ALIGN=LEFT></TD>"
    cart +="<TD ALIGN=RIGHT > Your Password </TD>"
    cart +="<TD ALIGN=RIGHT></TD>"
    cart +="<TD ALIGN=LEFT><INPUT TYPE='PASSWORD' NAME='PASSWORD'
VALUE=\'"+yourPassword+"\'onChange='top.isValidAlphaNum(this.value)'></TD>"
    cart +="</TR>"
    cart +="</TABLE><BR>"
    cart +="<INPUT TYPE='SUBMIT' VALUE='Send This Order'
onClick='top.isValidIDPasswd( )'></CENTER>"
    cart +="</TABLE>"
    cart +="</FORM>"
    cart +="</BODY>"
    cart +="</HTML>"
    return cart
}
//totalPrice for each item = unite price*quantity
function totalPrice(thisPoint, thisForm) {
    var numOfItemInCart=parseInt(top.cart.document.links.length)
    if (!isValidPosInteger(thisPoint.value)) {
    //invalid quantity!
        thisPoint.focus( )
    }
    else {
        for (var i = 0; i < numOfItemInCart; i++) {
            if (thisPoint.name==thisForm.elements[i*3+1].name){
            //detect the quantity of which item is changed, and put order # of the item into j.
                var j=i
                i=numOfItemInCart
            }
        }
        var price= thisForm.elements[j*3].value
        price= deleteString(price, "$")
        price= parseFloat(price)
        var qty= thisForm.elements[j*3+1].value
        qty= parseFloat(qty)
        var total=price*qty
        total=formatNum(total,2)
        if (total !=0.00) {
            thisForm.elements[j*3+2].value="$"+total
            calcSubtotal( )
            calcTax( )
            calcTotal( )
        }
        else {
        //quantity is changed to zero, delete the item from the cart.
            opSwitchBoard("deleteOneItem")
        }
    }
}
//tax=subtotal*taxRate
function calcTax( ) {
    var numOfItemInCart=parseInt(top.cart.document.links.length)
    if (!isValidPosNumber (top.cart.document.formForCart.elements[numOfItemInCart*3+1].value
)) {
    //checking if input value is valid. If invalid, the cursor will focus on the tax rate cell
        top.cart.document.formForCart.elements[numOfItemInCart*3+1].focus( )
    }
    else{
        //take tax rate
        var taxRate= top.cart.document.formForCart.elements[numOfItemInCart*3+1].value
        var value=0
        value=top.cart.document.formForCart.elements[numOfItemInCart*3].value //take subtotal
        value= deleteString(value, "$")
        value= parseFloat(value)
        var taxAmount =taxRate*value/100
        taxAmount=formatNum(taxAmount,2)
        top.cart.document.formForCart.elements[numOfItemInCart*3+2].value ="$"+taxAmount
        calcTotal( )
    }
}
function calcTotal( ) {
    var numOfItemInCart=parseInt(top.cart.document.links.length) //get the total # of items in the cart
```

-continued

```
    var tax= top.cart.document.formForCart.elements[numOfItemInCart*3+2].value //take tax
    var total=top.cart.document.formForCart.elements[numOfItemInCart*3].value //take subtotal first
    tax= deleteString(tax, "$")
    total= deleteString(total, "$")
    tax= parseFloat(tax)
    total= parseFloat(total)
    total +=tax
    total=formatNum(total,2)
    top.cart.document.formForCart.elements[numOfItemInCart*3+3].value ="$"+total
}
//The variable "cartBackup" is a global variable for backup purpose when users go to other home page,
//and return late. The variable "mySwitch" is used to decide what kind of the operation is to execute
// according to the "mySwitch" value,
//such as "firstItem" to cart, "addOneItem", "backup", and so on. It is also a global variable.
var cartBackup, mySwitch
function backup( ) {
    mySwitch="backup"
    opSwitchBoard( )
}
function reload( ) {
    mySwitch="reload"
    opSwitchBoard( )
}
//if "HR" is passed to this function, it write s horizontal ruler in the cart. Otherwise, it write a blank line.
function writeHrOrBlankLine(HR) {
    var leftBrace=" ", rightBrace=" "
    if (HR=="HR"){
        leftBrace="<"
        RightBrace">"
    }
    var cart ="<TR>"
    cart +="<TD COLSPAN='4'>"
    cart +=leftBrace+HR+rightBrace+"</TD>"
    cart +="</TR>"
    return cart
}
//this function create a web page for a search engine on the fly.
function writeSearchEngine( ){
    var engine="<HTML><HEAD><TITLE>Search Engine</TITLE></HEAD>"
    engine+="<BODY>"
    engine+="<CENTER>"
    engine+="<H2>The Search Engine</H2>"
    engine+="<HR>"
    engine+="<H4> Enter the name of the item you want. Then click the 'Seach the Store!'button.</H4>"
    engine+="<P><P>"
    engine+="<FORM method post action= >"
    engine+="<INPUT TYPE='text' NAME='query' SIZE='40'
    onChange='top.isValidAlpha(this.value)'><P>"
    engine+="<INPUT TYPE='RESET' VALUE='Clear Up'>"
    engine+="<INPUT TYPE='SUBMIT' VALUE='Seach the Store!'
    onClick='top.isValidAlpha(query.value)'>"
    engine+="</FORM>"
    engine+="</CENTER>"
    engine+="</BODY></HTML>"
    top.display.document.open( )
    top.display.document.write(engine)
    top.display.document.close( )
}
```

The invention claimed is:

1. A method of dynamic data assembling on client side of a LAN, a MAN, or the Internet using a web browser with a build-in engine that can execute client side application program on client side, comprising the steps of:

downloading a top file that controls directly or indirectly the setting of Display Window and Data Assembling Monitor Window from a server and getting client side application program ready to execute on the client side with said browser;

downloading a data file from said server or another server into said Display Window in which key data and nonkey data are specifically designed and can be retrieved dynamically and individually by said client side application program;

retrieving said key data and nonkey data from said data file and adding said key data and nonkey data into said Data Assembling Monitor Window by said client side application program actuated by actions of client party;

deleting data from said Data Assembling Monitor Window by said client side application program actuated by actions of client party and/or manually if necessary;

repeating above last three steps until the data set needed for a transaction is complete;

submitting said data set to a server, saving, and/or printing said data set on client side.

2. The method as set forth in claim 1 and further including the step of adding other key data and nonkey data automatically and/or manually.

3. The method as set forth in claim 2 and further including the step of updating automatically and/or manually.

4. The method as set forth in claim 2 and further including the step of checking entries automatically in said Data Assembling Monitor Window.

5. The method as set forth in claim 4 and further including the step of updating automatically and/or manually.

6. The method as set forth in claim 5 wherein said top file also creates a Control Panel to control routine operations that facilitate making a transaction.

7. The method as set forth in claim 1 wherein said top file also creates a Control Panel to control routine operations that facilitate making a transaction.

8. The method as set forth in claim 1 and further including the step of backing up and reloading automatically.

9. A method for an implementation of an Internet client side shopping cart using a web browser with a build-in engine that can execute client side application program on client side, comprising the steps of:

downloading a top file that controls directly or indirectly the setting of Display Window and Data Assembling Monitor Window as Internet Client Side Shopping Cart from a server and getting client side application program ready to execute on Internet client side with said browser;

downloading an item list file or an item introduction file from said server or another server into said Display Window in which key data and nonkey data about an items or items can be retrieved dynamically and individually;

retrieving said key data and nonkey data from said item list file or said item introduction file and adding them into said Internet Client Side Shopping Cart by said client side application program actuated by actions of client party;

adding other key data and nonkey data into said Internet Client Side Shopping Cart automatically and/or manually, and checking entries automatically in said Internet Client side Shopping Cart if necessary;

deleting data from said Internet Client Side Shopping Cart by said client side application program actuated by actions of client party and/or manually if necessary;

updating key data and nonkey data in said Internet Client Side Shopping Cart automatically and/or manually if necessary;

calculating total price, subtotal, and/or grand total in said Internet Client Side Shopping Cart automatically;

repeating above last six steps until the items in said Internet Client Side Shopping Cart needed for an order is complete;

submitting said order to a server.

10. The method as set forth in claim 9 and further including the step of putting user ID and/or password into said Internet Client Side Shopping Cart.

11. The method as set forth in claim 10 wherein said top file also creates a Control Panel to control routine operations that facilitate making a transaction.

12. The method as set forth in claim 9 and further including the step of putting URLs of web pages for each item as links into said Internet Client Side Shopping Cart automatically.

13. The method as set forth in claim 12 and further including the step of putting user ID and/or password into said Internet Client Side Shopping Cart.

14. The method as set forth in claim 13 wherein said top file also creates a Control Panel to control routine operations that facilitate making a transaction.

15. The method as set forth in claim 9 and further including the step of tax calculation.

16. The method as set forth in claim 15 wherein said top file also creates a Control Panel to control routine operations that facilitate making a transaction.

17. The method as set forth in claim 15 and further including the step of putting user ID and/or password into said Internet Client Side Shopping Cart.

18. The method as set forth in claim 17 wherein said top file also creates a Control Panel to control routine operations that facilitate making a transaction.

19. The method as set forth in claim 15 and further including the step of putting URLs of web pages for each item as links into said Internet Client Side Shopping Cart automatically.

20. The method as set forth in claim 19 and further including the step of putting user ID and/or password into said Internet Client Side Shopping Cart.

21. The method as set forth in claim 20 wherein said top file also creates a Control Panel to control routine operations that facilitate making a transaction.

22. The method as set forth in claim 9 wherein said top file also creates a Control Panel to control routine operations that facilitate making a transaction.

23. The method as set forth in claim 9 and further including the step of backing up and reloading automatically.

* * * * *